(12) United States Patent
Kurtz et al.

(10) Patent No.: US 11,066,976 B2
(45) Date of Patent: Jul. 20, 2021

(54) METHOD AND SYSTEM FOR CATALYST TEMPERATURE CONTROL

(71) Applicant: Ford Global Technologies, LLC, Dearborn, MI (US)

(72) Inventors: Eric Kurtz, Dearborn, MI (US); Sathish Atluri, Novi, MI (US); Daniel Styles, Canton, MI (US); Paul Tennison, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/150,107

(22) Filed: Oct. 2, 2018

(65) Prior Publication Data

US 2020/0102874 A1    Apr. 2, 2020

(51) Int. Cl.

| | |
|---|---|
| *F01N 9/00* | (2006.01) |
| *F01N 3/20* | (2006.01) |
| *F02D 41/14* | (2006.01) |
| *F02D 41/02* | (2006.01) |
| *F02D 41/06* | (2006.01) |
| *F01N 13/00* | (2010.01) |

(52) U.S. Cl.
CPC ........... *F01N 9/007* (2013.01); *F01N 3/2013* (2013.01); *F01N 3/2033* (2013.01); *F02D 41/024* (2013.01); *F02D 41/064* (2013.01); *F02D 41/144* (2013.01); *F01N 13/008* (2013.01); *F02D 2200/701* (2013.01)

(58) Field of Classification Search
CPC .... F01N 2900/12; F01N 3/023; F01N 3/0232; F01N 3/0233; F01N 3/0842; F01N 9/00; F01N 9/002; F02D 2200/0625; F02D 2200/606; F02D 2200/701; F02D 41/027; F02D 41/1406; Y02T 10/24; Y02T 10/47
See application file for complete search history.

(56) References Cited

U.S. PATENT DOCUMENTS

| | | | |
|---|---|---|---|
| 5,320,523 A | 6/1994 | Stark | |
| 5,339,630 A | 8/1994 | Pettit | |
| 5,694,770 A | 12/1997 | Brück et al. | |
| 5,996,338 A | 12/1999 | Hirota | |
| 6,553,301 B1 | 4/2003 | Chhaya et al. | |
| 6,951,099 B2 | 10/2005 | Dickau | |

(Continued)

FOREIGN PATENT DOCUMENTS

| | | |
|---|---|---|
| DE | 19544417 A1 | 6/1997 |
| DE | 102016003741 A1 | 10/2017 |
| JP | H07238825 A | 9/1995 |

OTHER PUBLICATIONS

Zenner, T. et al., "Method and System for Exhaust-Gas Heat Management," U.S. Appl. No. 16/013,584, filed Jun. 20, 2018, 49 pages.

*Primary Examiner* — Phutthiwat Wongwian
*Assistant Examiner* — Diem T Tran
(74) *Attorney, Agent, or Firm* — Geoffrey Brumbaugh; McCoy Russell LLP

(57) ABSTRACT

Methods and systems are provided for improving catalyst function during an engine cold-start. In one example, at key-off, a duration elapsed till a subsequent key-on is predicted based on drive history and spatial awareness data. Then, based on the duration, an identity and order of operating one or more catalyst heating devices is selected.

15 Claims, 4 Drawing Sheets

(56) References Cited

U.S. PATENT DOCUMENTS

| | | | | |
|---|---|---|---|---|
| 7,933,711 | B1* | 4/2011 | Ulrey | F02D 41/008 |
| | | | | 701/112 |
| 8,347,607 | B2 | 1/2013 | Gonze et al. | |
| 9,824,505 | B2* | 11/2017 | Tseng | G07C 5/00 |
| 2007/0198184 | A1* | 8/2007 | Yoshioka | G01C 21/36 |
| | | | | 701/426 |
| 2010/0043404 | A1 | 2/2010 | Hebbale et al. | |
| 2014/0335994 | A1* | 11/2014 | Otake | B60W 30/181 |
| | | | | 477/3 |
| 2015/0077276 | A1* | 3/2015 | Mitchell | H04W 4/021 |
| | | | | 340/995.1 |
| 2015/0260074 | A1* | 9/2015 | Argolini | F01N 9/00 |
| | | | | 701/102 |
| 2017/0082043 | A1* | 3/2017 | Dudar | F02D 41/024 |

* cited by examiner

METHOD AND SYSTEM FOR CATALYST TEMPERATURE CONTROL

FIELD

The present description relates generally to methods and systems for controlling a vehicle engine to maintain catalyst temperature and reduce engine restart emissions.

BACKGROUND/SUMMARY

Engine out cold-start emissions generated before light-off of an exhaust system emission control device (e.g., a catalytic converter) may contribute a large percentage of the total exhaust emissions. Such emissions may occur when an engine is restarted following an engine shutdown or during frequent engine start/stop operations, such as may occur in traffic. Various approaches may be used by engine control systems to expedite the attainment of the catalyst light-off temperature. For example, expensive electric catalyst heaters may be used to generate the heat. As another example, various combinations of spark timing retard, valve overlap, and increased fuel injection may be used to expedite catalyst warming.

In another approach shown by Dickau in U.S. Pat. No. 6,951,099, a catalytic converter is encapsulated by an insulating vessel. Additionally, a phase change material is flowed through the insulating vessel to maintain the catalyst temperature elevated above the light-off temperature. Still other approaches may include the use of a hydrocarbon burner that burns fuels and injects hot gas into an exhaust manifold upstream of the catalyst, such as shown by Pettit in U.S. Pat. No. 5,339,630.

However, the inventors herein have recognized potential issues with such systems. As one example, it may be difficult to balance fuel economy and exhaust emissions given that the engine may be shut down for a variable amount of time. In particular, if the engine is shut down due to the vehicle being parked for a long term, the actions for heating the engine may result in high fuel and power consumption, degrading the fuel economy of the vehicle. The same may occur if the engine is shut down due to the vehicle being a hybrid vehicle that is operated in an electric mode for a prolonged duration (such as due to low torque demand). On the other hand, if the actions are not taken when the engine is shut down due to the vehicle being parked for a short term, exhaust emissions are degraded when the engine is restarted. The same may occur if the engine is shut down temporarily due to the vehicle being a hybrid vehicle that is transitioning between an electric mode, an engine mode, and an assist mode (where both motor torque and engine torque are used), such as due to vehicle travel on changing terrain.

In one example, the issues described above may be addressed by a method for catalyst temperature control comprising: at a vehicle key-off event, selectively operating one or more exhaust catalyst heating devices based on a combination of vehicle drive history and vehicle positional information. In this way, catalyst temperature control may be better balanced with fuel economy.

As one example, an engine exhaust system may be configured with multiple heating devices for heating an exhaust after-treatment device catalyst. The multiple heating devices may include an electric catalyst heater coupled to the catalyst (e.g., integrated into a brick of the catalyst), a hydrocarbon burner coupled upstream of the catalyst, the burner working in cooperation with an air pump and an optional fuel injector, and a phase changer material based heat exchange system circulating a phase change material through a cavity surrounding the catalyst. A vehicle controller may select a combination of heating devices to operate, and a relative order of operation, based on an anticipated duration of vehicle parking at a given key-off event. The duration of vehicle parking may be anticipated based on GPS location information of the vehicle, such as via a navigation system of the vehicle, as well as based on a drive history of the vehicle operator. Geostationary location of the driver relative to the geostationary location of the vehicle at the key-off event may also be determined from the driver's mobile phone signal or a GPS tracking device integrated into the vehicle key fob. For example, based on businesses located at the driver's location or within a threshold radius of the vehicle's parking location, as well as a drive history of businesses frequented by the vehicle operator and an average time spent by the vehicle operator at those businesses, the controller may predict how long the vehicle is likely to be parked. Also, during an engine idle-stop at a traffic light, a duration of the idle-stop may be estimated based on the current traffic conditions as retrieved via the on-board GPS. Further, enablement of (and selection of which of) the heating devices may be based on a distance of the driver from the vehicle as estimated based on the GPS tracker on the vehicle key fob (carried by the driver). If the vehicle is expected to be parked long term (e.g., 30-60 mins) and/or if the driver is further than a threshold distance from the vehicle (e.g. 1 miles), the heating devices are maintained disabled and the catalyst is allowed to cool. If the vehicle is expected to be stopped or parked short term (e.g., 5-20 mins) and/or if the driver is within the distance from the vehicle, one or more heating devices are enabled to heat the catalyst For example, the electric heater may be operated if there is sufficient battery state of charge. As another example, the burner may be operated if there is sufficient fuel in the vehicle's fuel tank.

In this way, catalyst heating operations may be coordinated with vehicle navigational information to better balance fuel economy and exhaust emissions. By selectively enabling catalyst heating at a key-off event responsive to an anticipated short duration of vehicle parking, catalyst function may be maintained for the imminent engine restart. By disabling catalyst heating at a key-off event responsive to an anticipated long duration of vehicle parking, a reduction in fuel economy due to power consumption by the heating devices is reduced. By statistically or stochastically learning various attributes of a vehicle operator's driving pattern, and combining them with positional information from a navigation device, the controller may be able to predict the duration of vehicle parking more reliably and accurately, improving catalyst heating efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
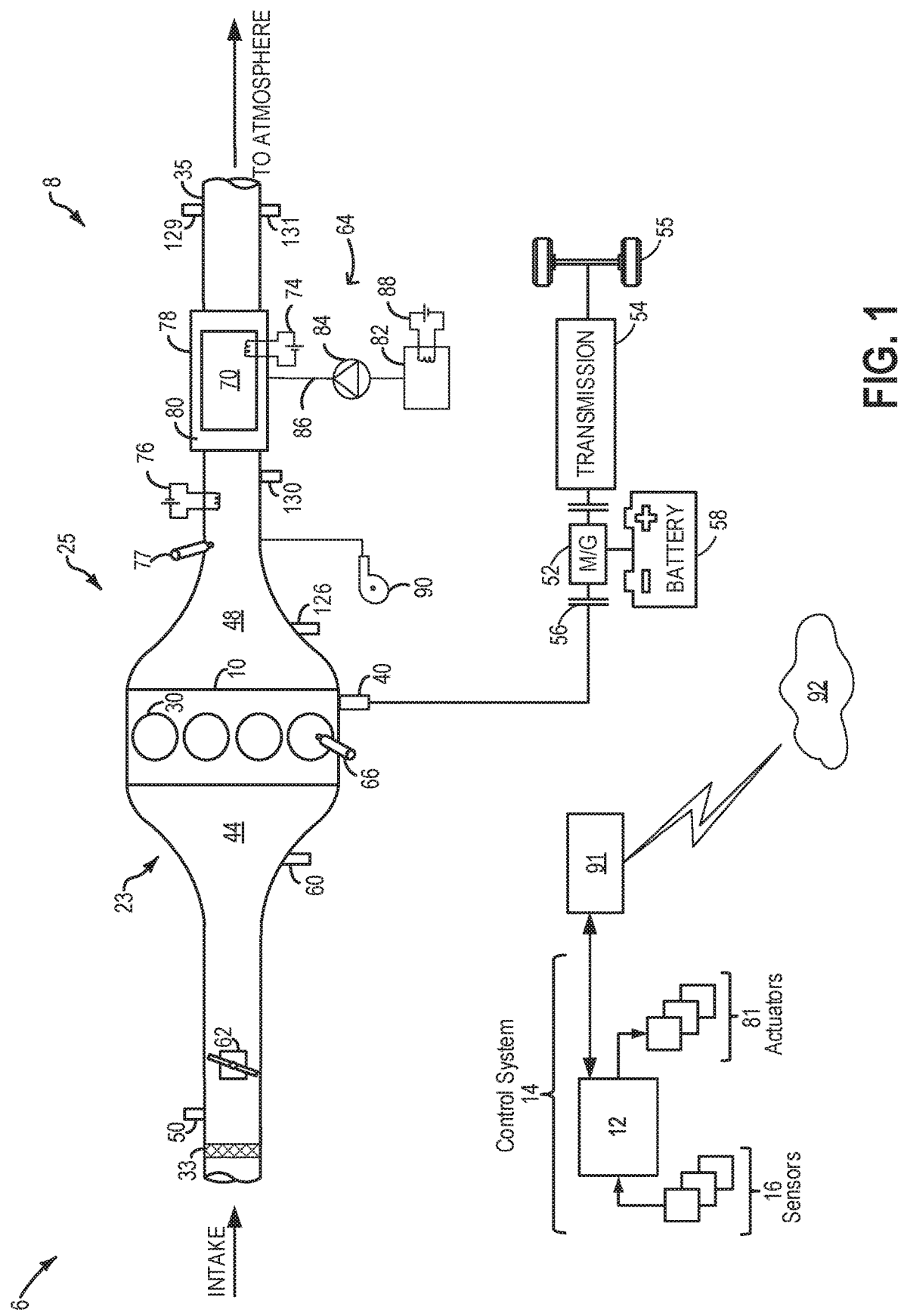
FIG. 1 shows an example hybrid vehicle system including various engine exhaust system components for maintaining a temperature of an exhaust catalyst.

The following description relates to systems and methods for reducing cold-start emissions in a vehicle engine, such as the engine system of FIG. 1 coupled in a hybrid electric vehicle. A controller may be configured to perform a control routine, such as the example routine of FIG. 2, to select one or more catalyst heating devices to operate, including an order of their operation, based on where the engine has been shut down and an anticipated duration of engine shutdown. The controller may predict the duration based on businesses located in the vicinity of a spot where the vehicle has been parked, as well as driver history regarding businesses they tend to frequent and durations they tend to spend at those businesses (FIG. 3). In this way, catalyst heating operations can be adjusted to better balance exhaust emissions and fuel economy.

FIG. 1 depicts a hybrid propulsion system 6 for a vehicle 5. In the depicted embodiment, the vehicle 5 is a hybrid electric vehicle (HEV) that can derive propulsion power from engine system 8 and/or an on-board energy storage device, herein battery 58. In alternate embodiments, propulsion system 6 may only derive propulsion power from engine system 8. Engine system 8 includes an internal combustion engine 10 having a plurality of cylinders 30. Fuel may be provided to each cylinder of engine 10 from a fuel system (not shown) including one or more fuel tanks, one or more fuel pumps, and injectors 66.

In the present example, engine 10 is a diesel engine wherein cylinder combustion is initiated via charge stratification. In other examples, the engine may be a spark-ignition engine, such as when the engine is powered using gasoline. Combustion events in each cylinder drive a piston which in turn rotates a crankshaft 40, as is well known to those of skill in the art. Further, engine 10 may include a plurality of engine valves for controlling the intake and exhaust of gases in the plurality of cylinders.

Engine 10 includes an engine intake 23 and an engine exhaust 25. Engine intake 23 includes a main air intake throttle 62 fluidly coupled to the engine intake manifold 44 via an intake passage 42. Air may enter intake passage 42 from an air intake system including an air filter 33 in communication with the vehicle's environment. A position of main throttle 62 may be varied by controller 12 via a signal provided to an electric motor or actuator included with the main throttle 62, a configuration that is commonly referred to as electronic throttle control. In this manner, throttle 62 may be operated to vary the intake air provided to the intake manifold.

In the example embodiment shown in FIG. 1, mass air flow (MAF) sensor 50 is coupled in intake passage 42 for providing signals regarding mass air flow in the intake passage to controller 12. In the depicted example, MAF sensor 50 provides a signal regarding mass air flow at the inlet of intake passage 42, upstream of air filter 33. However, it will be appreciated that the MAF sensors may be coupled elsewhere in the intake system or engine system, and further, there may be a plurality of MAF sensors arranged in the intake system or engine system.

A sensor 60 may be coupled to intake manifold 44 for providing a signal regarding manifold air pressure (MAP) and/or manifold vacuum (MANVAC) to controller 12. For example, sensor 60 may be a pressure sensor or a gauge sensor reading vacuum, and may transmit data as negative vacuum (e.g., pressure) to controller 12. In some examples, additional pressure/vacuum sensors may be coupled elsewhere in the engine system to provide signals regarding pressure/vacuum in other areas of the engine system to controller 12. These may include, for example, a sensor coupled to intake passage 42 upstream of the compressor, for providing a signal regarding barometric pressure (BP), a compressor inlet pressure (CIP) sensor arranged upstream of the compressor, etc.

In the depicted embodiment, engine system 8 does not include a boosting device and operates with natural aspiration. However, in alternate embodiments, engine system 8 may be a boosted engine system including a boosting device in the form of a compressor. The compressor may be, for example, the compressor of a turbocharger, wherein compressor is coupled to and driven by an exhaust turbine via a shaft. Further, the compressor may be, at least in part, driven by an electric motor or the engine crankshaft. In alternate embodiments, the boosting device may be a compressor of a supercharger wherein the compressor is driven only by the electric motor. When included, the compressor is configured to boost an intake air charge received along intake passage 42.

Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include, for example, an oxidation catalyst, a NOx trap, a selective catalytic reduction (SCR) catalyst, a particulate matter (PM) filter, etc. Still other emission control devices may be coupled to the exhaust, such as a three-way catalyst, etc.

When the engine is started under cold ambient conditions, or when the engine is started after a sufficiently long period of being shutdown (e.g., while the vehicle was being propelled via the motor or while the vehicle was shutdown), the exhaust catalyst (e.g., the oxidation catalyst or catalytic converter) may be at a temperature lower than its activation temperature (also known as the light-off temperature). As such, engine out cold-start emissions generated before light-off of the exhaust catalytic converter contribute a large percentage of the total exhaust emissions. To reduce these emission, various approaches may be used to expedite heating of the catalyst and attainment of the catalyst light-off temperature. For example, catalyst heater 74 may be employed. Catalyst heater 74 is depicted as an electrical heater integrated into the catalyst, such as into the catalyst brick, on a front face. However in alternate embodiments, the electrical heater may be separate and may not be integrated into the catalyst brick. As an example, the electric heater may be positioned around (wrapped around) the catalyst, or placed in front of the catalyst. The electrical heater may include an electric coil through which a variable amount of current, drawn from an associated battery, can be flowed based on a degree of heating required. Controller 12 may adjust the current supplied to heater 74 based on a difference between the temperature of the catalyst and the light-off temperature. The heater 74 may be positioned within the catalyst so as to heat an entirety of the catalyst brick, or to preferentially heat a particular face of the brick, e.g., front face receiving exhaust gas from the engine. While heater 74 allows the temperature of the exhaust catalyst 70 to be rapidly raised, it may be energy intensive. In one example, controller 12 may limit a duration of operation of heater 74 to reduce the fuel economy impact of operating the heater. Engine controller 12 may adjust an amount of current to pass through heater 74, as well as a duration over which to pass the current, based on an amount of actual or expected cooling at the catalyst 70.

Catalyst heating may also be enabled via hydrocarbon burner 76 positioned in the exhaust passage upstream of the exhaust catalyst. Specifically, hydrocarbon (HC) burner may be configured to combust unburned fuel in the exhaust gas upstream of the catalyst 70. HC burner 76 may be powered via a dedicated battery. As a result, a temperature of the exhaust gas reaching and passing through the catalyst is elevated. In one example, an amount of unburned fuel available for combusting by the HC burner 76 may be increased by operating engine cylinders richer than stoichiometry for a duration. Alternatively, an optional HC injector 77 may be positioned in the exhaust passage, upstream of the hydrocarbon burner 76, for injecting an amount of fuel for combustion via the HC burner 76. Additionally, an air pump 90 may also be provided proximate (e.g., upstream of) the HC burner to assist in the combustion. Specifically, an amount of fresh air may be delivered into the exhaust passage, upstream of the HC burner 76 via the air pump 90. In one embodiment, air may be provided directly into the HC burner. The additional oxygen further improves the combustion of hydrocarbons at the HC burner 76. Air pump 90 may be powered via a dedicated battery (not shown) or using electrical power drawn from system battery 58. Engine controller 12 may adjust one or more (or all) of an amount of current to pass through HC burner 76, a duration over which to pass the current, a degree of richness of cylinder combustion, output of air pump 90, and a pulse width of HC injector 77, based on an amount of actual or expected cooling at the catalyst 70. In one example, operation of the HC burner is adjusted as a function of a fill level of an engine fuel tank delivering fuel to fuel injector 66, and optionally also to injector 77. As an example, when the fuel level is above a first threshold, the HC burner may consume fuel at a first rate to raise the catalyst temperature, while if it below the threshold, fuel at a second rate may be supplied to the HC burner to either maintain catalyst temperature or slow the cooling rate, the second rate lower than the first rate. Further, if the fuel level is below a second threshold, the burner may not be activated to conserve the fuel remaining in the tank level, the second threshold lower than the first threshold. In one example, each of the first threshold and the second threshold may be calibrated based on a distance remaining in the drive cycle and the fuel efficiency of the vehicle. The distance remaining may be estimated based on navigation system inputs or driver history. As an example, each of the first threshold and the second threshold may be proportionately decreased with a decrease in the distance remaining in the drive cycle.

Catalyst heating may also be enabled via a phase change material (PCM) circuit 64. Exhaust catalyst 70 may be positioned inside a cover 78 such that a cavity 80 surrounds the catalyst 70. The PCM circuit 74 may be configured to flow a phase change material through the cavity 80. One example PCM includes a mixture of sodium nitrate, potassium nitrate, or calcium nitrate. The PCM may function as a heat reservoir for storing excess heat for later use, and for providing stored heat for heating the exhaust catalyst when cold. A PCM stores heat by undergoing a phase transition at a characteristic temperature (the transition temperature), the enthalpy change associated with this phase change is large, and the PCM is able to absorb and release large amounts of thermal energy as they change phase. Thus, when excess waste exhaust heat is available, such as during engine operation at higher loads, exhaust heat may be stored within the cold PCM for later use by flowing the PCM through the cavity. During a cold-start, when catalyst heating is required, the heated PCM may be circulated through the cavity to transfer heat to the exhaust catalyst. Circulating the PCM may include the controller 12 operating a PCM pump 84 which draws the PCM from a reservoir 82 and flows it through the cavity 80 via a dedicated passage 86. Optionally, if the PCM is not sufficiently hot during the catalyst heating operation, a temperature of the PCM drawn from the reservoir 82 may be increased by operating an electrical PCM heater 88. The PCM electrical heater may be powered via a dedicated battery. As the warmed PCM flows around the catalyst 70, the PCM may decrease in temperature and partially or completely undergo a phase transition, such as when it transitions from a liquid to a solid, thereby releasing waste heat to the catalyst. Engine controller 12 may adjust one or more (or all) of a PCM pump speed and flow rate and an amount of current to pass through PCM heater 88 based on an amount of actual or expected cooling at the catalyst 70. In one example, instead of three distinct heaters, a single heater may be used for catalyst heating. The single heater may be one of the catalyst heater 74, HC burner heater 76, and the PCM heater 88.

It will be appreciated that while electrical heaters 74, 76, and 88 are shown coupled to dedicated batteries, in other embodiments, each of the electrical heaters may be powered with energy received from a common system battery 58. Therein, a selection of which heater to operate during a request for catalyst heating, as well as an order of operating the heaters may be selected based at least on a state of charge of the system battery. For example, if the fuel level is above the first threshold (previously described), the HC burner heater may be first used for catalyst heating. If the fuel level decreases to below the first threshold, while the SOCs of the one or more batteries supplying power to the catalyst heater 74 and the PCM heater 88 are higher than a threshold SOC, one or more of the catalyst heater 74 and the PCM heater 88 may be used for catalyst heating. If the SOC of a battery decreases to below the threshold SOC, the corresponding heater may no longer be used for catalyst heating. In one example, the threshold SOC may correspond to a SOC desired for operating the vehicle during an immediately upcoming vehicle start. If the SOC of each of the batteries powering each of the catalyst heater 74 and the PCM heater 88 is lower than the threshold, either of the heaters 74 and 88 may not be operated for catalyst heating. During such a condition, if the fuel level is above the second threshold (previously described), the HC burner heater may be used to provide heat to the catalyst at a lower rate. In this way, by using a combination of heaters, battery charge and fuel level may be maintained above respective thresholds as desired for operating the vehicle during the immediately subsequent vehicle operation.

In one example, it may be desired to slow down (stall) the cooling of the catalyst such that the catalyst temperature may not decrease below its light-off temperature. Instead of actively heating the catalyst, in order to maintain the catalyst temperature above the light-off temperature, a lower amount of power (relative to an amount of power desired to heat the catalyst to above the light-off temperature) may be supplied from one or more heaters to counter the effect of environmental cooling. In this way, the amount of energy used for catalyst heating may be reduced and a smaller sized heater may be used for this purpose. As an example, upon vehicle engine-off, the controller may estimate the amount of time the vehicle engine may be maintained in the off state and the controller may estimate a minimum amount of power that may be supplied to the catalyst to decrease the rate of cooling of the catalyst and to increase the temperature of the catalyst to the light-off temperature during the immediately subsequent engine on. In one example, the controller may use a lookup table to determine the amount of energy to be supplied to the catalyst over time (rate of energy supply) with the engine-off duration as input and rate of energy supply as output. The rate of energy supply may be constant or may vary as a function of time.

Further still, catalyst heating may be enabled via a coordinated operation of a combination of the available heaters. While the electric catalyst heaters are used to generate heat locally at the catalyst, still other approaches may be used for catalyst heating. For example, various combinations of spark timing retard, valve overlap, and increased fuel injection may be used to raise exhaust temperature and thereby expedite catalyst warming. Controller 12 may select between the different approaches based on a comparison of the effect of each heater on vehicle fuel economy and performance.

Figure 2:
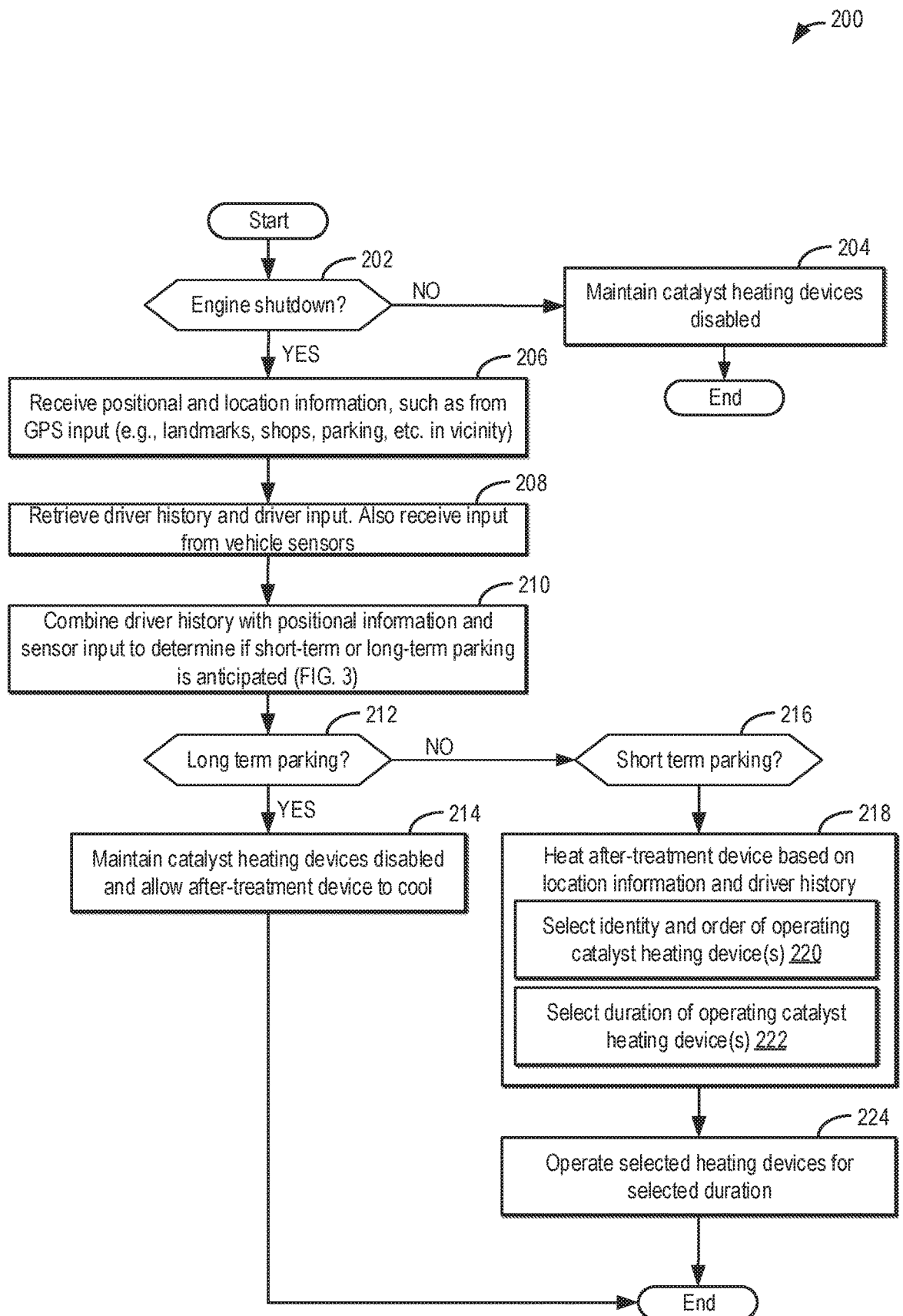
FIG. 2 shows a high level flow chart of a method for reducing engine cold-start emissions.
Figure 3:
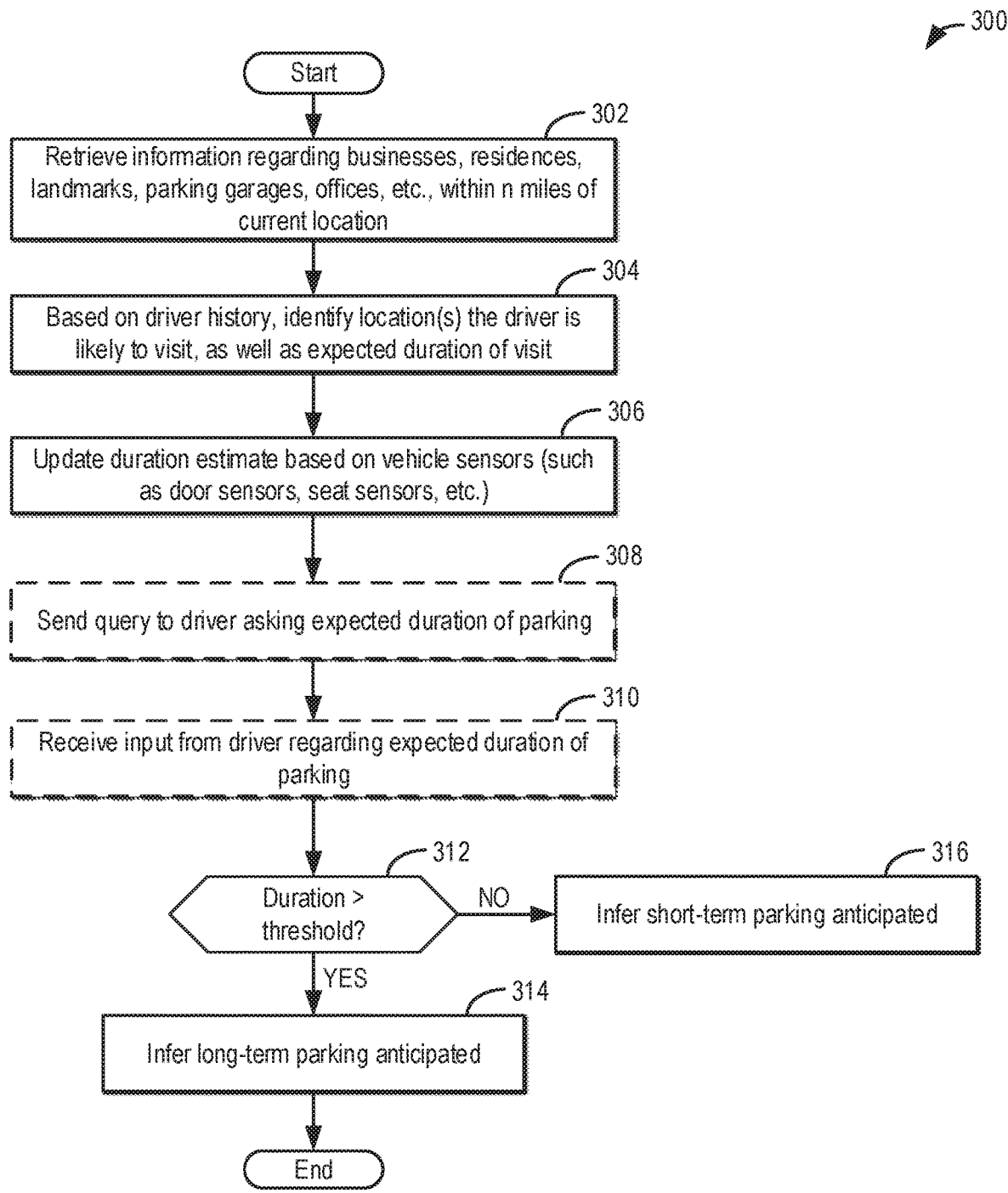
FIG. 3 shows a high level flow chart for anticipating a duration of engine shutdown based at least one vehicle positional information.

As further elaborated at FIG. 2, the engine controller may select between which methods to use for catalyst heating based on an expected amount of catalyst cooling. For example, the controller may anticipate a duration of engine shutdown based on sensor input (such as from vehicle cabin sensors, door sensors, vehicle cameras, etc.) and information from a navigational system 91 of the vehicle, the navigational system 91 communicatively coupled (e.g., via wireless or Bluetooth communication) to a network 92 and configured to receive information such as traffic conditions, weather conditions, etc., from the network. In addition, the duration of engine shutdown may be further based on drive history of the vehicle operator including information regarding locations they frequent, how often they frequent those locations, a time (day of week, hour of day) when those places are visited, how long they spend at establishments in those locations, etc. This allows the use of the heaters to be adjusted to better balance the heating requirements of the catalyst with the fuel economy loss associated with heater usage. For example, heating may be disabled if the controller anticipates that the vehicle will be parked with the engine shutdown for longer than a threshold duration. Selective operation of one or more heating devices may be further based on the vehicle positional information relative to a position of a vehicle operator, the vehicle operator position inferred based on signals received from a key fob or communication device held by the operator.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 55 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation. Electric machine 52 may generate energy when operated in a regenerative mode to absorb energy from vehicle motion and/or the engine and convert the absorbed kinetic energy to an energy form suitable for storage in battery 58. Furthermore, electric machine 52 may be operated as a motor or generator, as required, to augment or absorb torque provided by the engine, such as during a transition of engine 10 between different combustion modes (e.g., during transitions between a spark ignition mode and a compression ignition mode).

Hybrid propulsion system 6 may be operated in various embodiments including a full hybrid system, wherein the vehicle is driven by only the engine and machine cooperatively, or only the electric machine, or a combination. Alternatively, assist or mild hybrid embodiments may also be employed, wherein the engine is the primary source of torque and the electric machine selectively adds torque during specific conditions, such as during a tip-in event.

Propulsion system 6 may further include control system 14. Control system 14 is shown receiving information from a plurality of sensors 16 and sending control signals to a plurality of actuators 81. As one example, sensors 16 may include exhaust gas sensor 126 located upstream of the emission control device, exhaust temperature sensor 128, exhaust pressure sensor 129, MAP sensor 60, MAF sensor 50, ambient temperature sensor, and various vehicle sensors such as cabin sensors, seat sensors, door sensors, window sensors, etc. Other sensors such as additional pressure, temperature, air/fuel ratio, and composition sensors may be coupled to various locations in the propulsion system 6. As another example, the actuators may include fuel injector 66, throttle 62, electric heater 74, HC burner 76, HC injector 77, PCM pump 84, and PCM heater 88. The control system 14 may include a controller 12. The controller may receive input data from the various sensors, process the input data, and trigger the actuators in response to the processed input data based on instruction or code programmed therein corresponding to one or more routines. The controller 12 receives signals from the various sensors of FIG. 1 and employs the various actuators of FIG. 1 to adjust vehicle operation based on the received signals and instructions stored on a memory of the controller. It will be appreciated that vehicle operation may be adjusted by the controller based on actions performed by the controller and/or in combination with actions performed by various vehicle and engine actuators acting in concert with the controller. For example, the controller may flow a current through heater 74 responsive to a drop in the temperature of the exhaust catalyst 70. An example control routine is described herein with regard to FIG. 2.

Turning now to FIG. 2, an example routine 200 is shown for selecting a mode of heating an exhaust catalyst during cold-start conditions. The method enables heater usage to be better balanced with fuel economy. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes confirming an engine shutdown being requested. In one example, an engine shutdown is requested by a vehicle operator when the vehicle is keyed off and the operator exits the vehicle. In another example, the engine is shutdown during idle-stop engine operation where the engine torque demand is lower than a threshold for over a threshold duration of time, such as when the vehicle is stopped at a traffic light. The engine shutdown during idle-stop operation may be requested without operator input, responsive to the lower than threshold torque demand.

If an engine shutdown is not confirmed, such as when the engine continues to combust fuel, then at 204, the method includes maintaining all catalyst heating devices in the current state and not using battery power to heat the catalyst. In one example, the current state may include maintaining the heating devices disabled. In another example, one or more of the heating devices may be operational for providing heat to an engine component other than the catalyst.

At 206, if an engine shutdown is confirmed, the method includes receiving positional and locational information from one or more sensors and navigational system of the vehicle. The positional and locational information may include information regarding landmarks, shops, parking garages, residences, and other establishments in the vicinity of the vehicle. In one example, positional and locational information for a threshold radius around the vehicle (such as within 200 feet of the vehicle) may be retrieved. A GPS tracker may be included in the vehicle key fob and the operator's position upon leaving the vehicle may be tracked based on the GPS signal or his mobile phone signal. In this way, spatially aware data is collected for the vehicle and the operator.

At 208, the method includes retrieving a drive history for the vehicle operator. This includes retrieving a history of places driven to by the vehicle operator as a function of day of week, time of day, point of origin, etc. In addition, data regarding a number of stops, their location, and a duration of the stops on any given route selected by the operator may be retrieved. This allows the controller to identify patterns in vehicle operation, and predict therefrom if the engine is likely to be shut down, and if so, for how long.

As one example, at every vehicle key-on event, a duration elapsed since the immediately preceding key-off event may be determined. That is, a stopped duration of the vehicle may be estimated. In addition, origin characteristics including time and geographic location of the key-on event may be learned from the vehicle navigation system (e.g., GPS device). A time of vehicle key-on and key-off may also be learned, including a time of day when the vehicle is travelling, a date of travel, which day of the week the vehicle is travelling, etc. In this way, the controller may determine an amount of time the vehicle was stopped at a location (e.g., the point of origin) before beginning a subsequent trip.

The controller may learn details regarding a route of vehicle travel including road segments traveled. This may include a planned route of travel, an actual route of travel, and differences between the planned and actual route of travel. The details may be learned based on information from the vehicle navigation system. The controller may further learn operating conditions of vehicle travel. These may include, for example, frequency of brake and accelerator pedal application, frequency of brake and accelerator pedal release, transmission gear change frequency, duration of operation in electric mode versus engine mode, road and traffic conditions, changes in vehicle speed and engine speed, etc. In one example, a user profile with the driving characteristics of the operator may be transferred from a previous vehicle such that the re-learning process may be shortened.

When the vehicle is stopped at the key-off event, the controller may also learn destination characteristics including time of travel from point of origin to destination, location of the destination, time taken to reach the destination, time of arrival at destination (including time of day, date, day of week and other details). The controller may identify relations between the destination characteristics and the origin characteristics. Specifically, correlations between various aspects of the vehicle operation may be learned so as to learn driving patterns.

In one example, based on the learned relationships and correlations, tables related to operator driving patterns may be populated and uploaded. As an example, frequent trip time patterns in an operator's driving behavior may be indicated by a first set of maps populated as a function of stop time patterns on a weekday and on a weekend day. As such, for a trip or vehicle drive cycle, time element characterization may consider at least a drive time and a stop time. The drive time represents the time it takes to go from a start location A to a destination B. The stop time represents the total time the vehicle is stopped at destination B before the beginning of the next trip to destination C. Basic or simple characterization (for example, statistics) relevant to these time elements may include the learning of the average time it takes to go from A to B. For stop times, if the starting location is disregarded, the controller can learn the average amount of time the vehicle stays at B once it gets there. From the data, the controller may anticipate where the vehicle is likely to be at a given time of day, and further if the engine is shutdown, and if so, for how long.

Learning of operator driving patterns may also include learning key-on/key-off probabilities and weekday-weekend correlations. For example, the drive history may be represented graphically via a 7×7 correlation matrix of 7 days of the week for a given operator. Therein a grayscale chart may represent correlation values between days. Based on the map data, a probability curve can be learned inferring the similarities of different days of the week in a driver's driving behavior. For example, the data may indicate that driving patterns for a given operator on Sunday and Saturday are highly correlated while selected weekdays are more similar to one another (e.g., Monday is more similar to Tuesday and Thursday, and less similar to Wednesday and Friday, Monday also being very different from Saturday and Sunday). The correlation between different days enables the aggregation of information to yield data with more reliable patterns.

Additional habitual information can be gained by recursively learning probabilities using in-vehicle sensors, such as seat sensors, door sensors, window sensors, etc. For example, door sensor input indicative of whether an operator door was opened and/or closed may indicate an operator's intent to start the engine and drive the vehicle or shutdown the engine and park the vehicle. Further still, it may be predicted if a short term or long term parking of the vehicle is expected. As another example, window sensor input indicative of whether an operator window was opened and/or closed may indicate an operator's intent to start the engine and drive the vehicle or shutdown the engine and park the vehicle for a long term or a short term (the term being defined by a preset threshold duration). Similar predictions may be made based on seat sensor data indicative of whether an operator is in the driver's seat or not. For example, seat sensor input indicative of the operator's presence in the vehicle may indicate the intent to stop for a shorter time without leaving the vehicle such as during an engine idle-stop condition.

In still further examples, driver input may be requested and received at a vehicle key-off event. For example, an inquiry may be sent to the driver (e.g., displayed on a cabin display or sent as a message to the driver's cell phone) asking if the operator plans to park the vehicle for more than a threshold duration (e.g., more than 10 minutes, more than 20 minutes, etc.). Alternatively, an expected duration of leaving the vehicle parked may be queried. The operator's answer/input may be used as input to determine whether the vehicle will be parked short-term or long-term.

At 210, data regarding the drive history may be combined with real-time positional information and vehicle sensor input to determine if short term or long term parking of the vehicle is anticipated. For example, based on the combined data, the controller may determine where the vehicle operator is travelling to when the vehicle is stopped. As an example, it may be determined that when the vehicle operator keys off the vehicle at 9 am on a Monday, the operator has arrived at the work location from the home location (the operator's most likely destination on Monday mornings) and the vehicle will remain parked there long term till at least 5 pm. As another example, based on the combined data, it may be determined that when the vehicle operator keys off the vehicle at 830 am on a Friday, the operator has arrived at a coffee shop and will park outside that location for a short term (e.g., 10 mins) before restarting the engine and driving the vehicle to the work location.

The information gathered from the stop time patterns may then be used to predict a degree of exhaust catalyst cooling, and decide whether or not to initiate a catalyst heating operation. Details regarding the prediction of a long term or short term parking based on the gathered data are elaborated at FIG. 3.

Specifically, at 212, it may be determined if long term parking of the vehicle is anticipated, such as may occur when the vehicle is predicted to be parked for longer than a threshold duration. If yes, then at 214, catalyst heaters may be maintained disabled and the exhaust catalyst is allowed to cool down. Herein, the fuel penalty associated with operating one or more catalyst heaters over the long term parking duration exceeds the fuel penalty associated with heating the cold catalyst aggressively upon an engine restart. The method then ends.

If long term parking is not confirmed, at 216, it may be determined if short term parking of the vehicle is anticipated, such as may occur when the vehicle is predicted to be parked for shorter than the threshold duration. Short term parking may include idle-stop conditions when the vehicle is on-road and the vehicle is stopped without a key-off event (vehicle will restart without key-on). If yes, then at 218, one or more catalyst heating devices (or heaters) may be enabled to heat the exhaust catalyst and maintain the exhaust catalyst at or above the light-off temperature. Herein, the fuel penalty associated with operating one or more catalyst heaters over the short term parking duration is lower than the fuel penalty associated with heating the cold catalyst aggressively upon an engine restart. In one example, catalyst heating may be initiated after the catalyst temperature has dropped to below a threshold temperature, wherein the threshold temperature may be at or above the catalyst light-off temperature. In one example, the catalyst light-off temperature may be 200° C., and the threshold temperature may be 220° C. Therefore, catalyst heating may not be activated until the catalyst temperature falls to 220° C. By actively heating the catalyst, the catalyst temperature may be maintained above the light-off temperature (such as at 205° C.).

In this way, catalyst heating may be delayed to conserve power while catalyst temperature may be maintained above the threshold temperature. During shorter stops, the catalyst temperature may not drop to the threshold temperature and catalyst heating may not have to be initiated.

Heating the after-treatment device via operation of one or more catalyst heating devices may include, at 220, selecting an identity and order of operating the catalyst heating devices. For example, it may be determined if only the catalyst heater is to be operated, only the HC burner is to be operated, only the PCM circuit is to be operated, or a combination of these are to be used. Further, in the combination, an order of operating the devices may be determined. In one example, if the fuel level in the fuel tank is above a first threshold level, only the HC burner may be used for catalyst heating. If the fuel level is between the first threshold level and a second threshold level, and the SOC of the battery is above a threshold SOC, the electric heater and the HC burner may be used in combination until either fuel level decreases to below the second threshold (at which point the HC burner is deactivated) or the battery SOC decreases to below the threshold (at which point the electric heater is deactivated). In this way, while heating the catalyst, fuel level may be maintained above the second threshold level and the battery SOC may be maintained above the threshold SOC, as desired for vehicle operation during an immediately subsequent engine start.

At 222, a duration of operating each selected heating device is determined. For example, a duration of operating an electric catalyst heater relative to operating an upstream HC burner, when using a combination of both to heat the catalyst, may be determined. The duration may be estimated by the controller as a function of a time remaining to the immediately subsequent engine restart, fuel level, and battery SOC.

Based on the determined durations, at 224, the controller may send control signals to the selected heating devices to operate them for the selected durations.

As an example, if long-term parking is anticipated, no action is taken and the after-treatment device is allowed to cool. In comparison, if short-term parking is expected, an action is taken to maintain catalyst temperature. The action to maintain catalyst temperature may be initiated upon the catalyst temperature decreasing to a threshold temperature, the threshold temperature at or above the light-off temperature of the catalyst. Those actions may include operating the engine in a first heating mode wherein an electric catalyst heater (such as heater 74 of FIG. 1) is used to maintain catalyst skin temperature above a threshold (such as above 180-220° C.) to reduce heat loss from the catalyst substrate. Since the catalyst heater relies on battery charge, in one example, the first mode is selected to minimize energy consumption when the battery state of charge is higher than a threshold charge. As another example, the actions may include operating the engine in a second mode where a HC burner (such as burner 76 of FIG. 1) and an associated air pump (such as air pump 90 of FIG. 1) provide hot gases to the catalyst front face. In one example, the second mode may be selected responsive to a fuel tank fill level being higher than a threshold level. As yet another example, the actions may include operating an integrated heater to maintain substrate temperature at a threshold value subject to the battery state of charge. In this way, catalyst heating is invoked when the controller determines that parking will be short-term so as to maintain catalyst function for the restart. This could be during a very short-term stop-start event (such as for on-road engine idle-stop conditions when the engine is stopped without key-off) or a short-term shopping excursion (such as for drive through restaurants, gas station, flower stop, etc.).

In one example, a previously assessed short term parking may change to a long term parking situation based on conditions such as an operator's change of mind, road conditions, etc. After the catalyst is actively heated for a threshold duration (e.g. 5 minutes) if the engine is not restarted, the routine may return to step 210 to reassess if the parking would be for long term and short term. The time to restart may be estimated based on the geostationary location of the operator (from key fob GPS or mobile signal) relative to the geostationary location of the vehicle and if the operator is outside the threshold radius (as described in step 206), the catalyst heating may be discontinued. In another example, the heating may be discontinued after a threshold duration even if the engine is not restarted.

In this way, a duration of vehicle parking at a vehicle key-off event may be estimated based on spatial awareness data including a geostationary location of the vehicle at the key-off event and an identity of businesses and landmarks within a threshold radius of the vehicle, and further based on drive history; and one or more exhaust catalyst heating devices may be operated during the key-off event based on the predicted duration, the one or more exhaust catalyst heating devices selected based on vehicle conditions including battery state of charge and fuel tank fill level.

Turning now to FIG. 3, an example routine 300 is shown for predicting how long a vehicle engine is likely to be off at a given key-off event. The method of FIG. 3 may be performed as part of the method of FIG. 2, such as at 210.

At 302, information regarding local businesses, residences, landmarks, parking garages, offices, and other establishments located within a predefined distance or radius (e.g., within 200 feet) is retrieved from the vehicle navigation system, (or GPS system). The controller may identify landmarks such as municipal buildings, libraries, government offices, historical markers, etc., based on input from a GPS device of the navigational system, for example. The landmarks may further include public transportation locations such as bus stops, train stops, metro stops, etc. The controller may further identify residential places (houses, apartments, etc.) within the threshold radius. The controller may also identify local businesses, such as grocery stores, restaurants, hotels, etc. Further still, the controller may identify parking spots and parking garages within the threshold radius. For the parking places, the controller may determine a number of free spaces available, the parking rate, a maximum permitted parking duration, etc.

In addition to generic landmarks and businesses, the controller may also retrieve information regarding known, annotated, or frequented landmarks and businesses. For example, the driver may have annotated a landmark and it may be indicated that the vehicle is in the vicinity of "grandma's house". As another example, it may be indicated that the vehicle is in the vicinity of "office", or "favorite coffee shop", as annotated based on operator input.

At 304, based on a drive history of the operator, and further based on a location of the vehicle at a time of the key-off event, the controller may identify the locations (or landmarks) the driver is most likely to visit while the vehicle is keyed off, as well as an expected duration of the visit.

As an example, it may be determined that when the vehicle operator keys off the vehicle at 830 am on a Monday in the vicinity of an often visited coffee shop, the operator is likely to be headed to the coffee shop with the vehicle remaining parked for a short term (e.g., expected to remain parked for 10 mins) before restarting the engine and driving the vehicle to a work location. As another example, when the operator keys off at 9 am on Monday in a parking garage proximate the work location, the vehicle is likely to remain parked there long term till at least 5 pm (that is, for 8 hours). As yet another example, when the operator parks at a location proximal to a school or a daycare center at 8:30 am on a weekday, the operator is likely to be back within a short time after dropping off a child (that is, for 5-15 minutes).

At 306, the expected duration is further updated based on vehicle sensor information and/or input received from the vehicle operator. For example, the duration may be updated based on information from window sensors, door sensors, seat sensors, etc. In one example, based on inputs from door sensors (such as any vehicle door not being opened), it may be inferred if any occupants have left the vehicle. Also, seat sensors may indicate presence of an occupant on the seat. If it is inferred that any occupant has not left the vehicle, it may be likely that the vehicle will be parked for a shorter duration (such as in an idle-stop situation). Also, if the operator leaves the vehicle, the position of the operator, as estimated based on GPS tracking in the vehicle key fob or his mobile phone signal, may be used to determine the time needed for the operator to return to the vehicle. The time need to return to the vehicle may be the duration of the vehicle stop.

The expected duration may also be optionally updated based on input received after querying the driver as to their intent. For example, at 308, the controller may optionally send a query to the driver at a key-off event asking them their expected duration of parking. The query may be provided as a display message, or a message sent to a personal computing device (e.g., smartphone, tablet, etc.) of the operator. At 310, the input is received. As an example, upon querying, the operator may indicate that they intend to stay at the coffee shop for 1 hour instead of the usual 5 mins.

At 312, it may be determined if the expected duration is higher than a threshold duration, such as higher than 10 mins or 20 mins. If not, then at 316, short term vehicle parking is anticipated and accordingly catalyst heating operations may be prioritized and expedited. If the expected duration is longer than the threshold duration, then at 314, long term vehicle parking is anticipated and accordingly catalyst heating operations may be deprioritized and/or disabled.

A controller may determine whether a vehicle that is stopped with the engine shut off is "parked" short-term (<10-20 minutes) or long-term (>10-20 minutes). As an example, the controller may infer or predict this by looking at whether the vehicle is on a road or parking location using GPS location and if in a parking location, based on the type of parked location (e.g., near a small store, a grocery store, work, home, etc.). The controller may rely on GPS location input from a vehicle navigation system. The controller may further determine whether the vehicle is likely to be parked for a short time or an extended period of time base on recorded driver's habits, GPS location, and the time of day. The controller may then adjust catalyst heating based on actual and anticipated vehicle parking and engine-off durations.

In this way, the one or more exhaust catalyst heating devices may be operated during the key-off event if the predicted duration is lower than a threshold duration; and the one or more exhaust catalyst heating devices may be disabled during the key-off event if the predicted duration is higher than the threshold duration, the threshold duration based on one or more of the exhaust catalyst temperature, an ambient temperature, and a catalyst light-off temperature.

Figure 4:
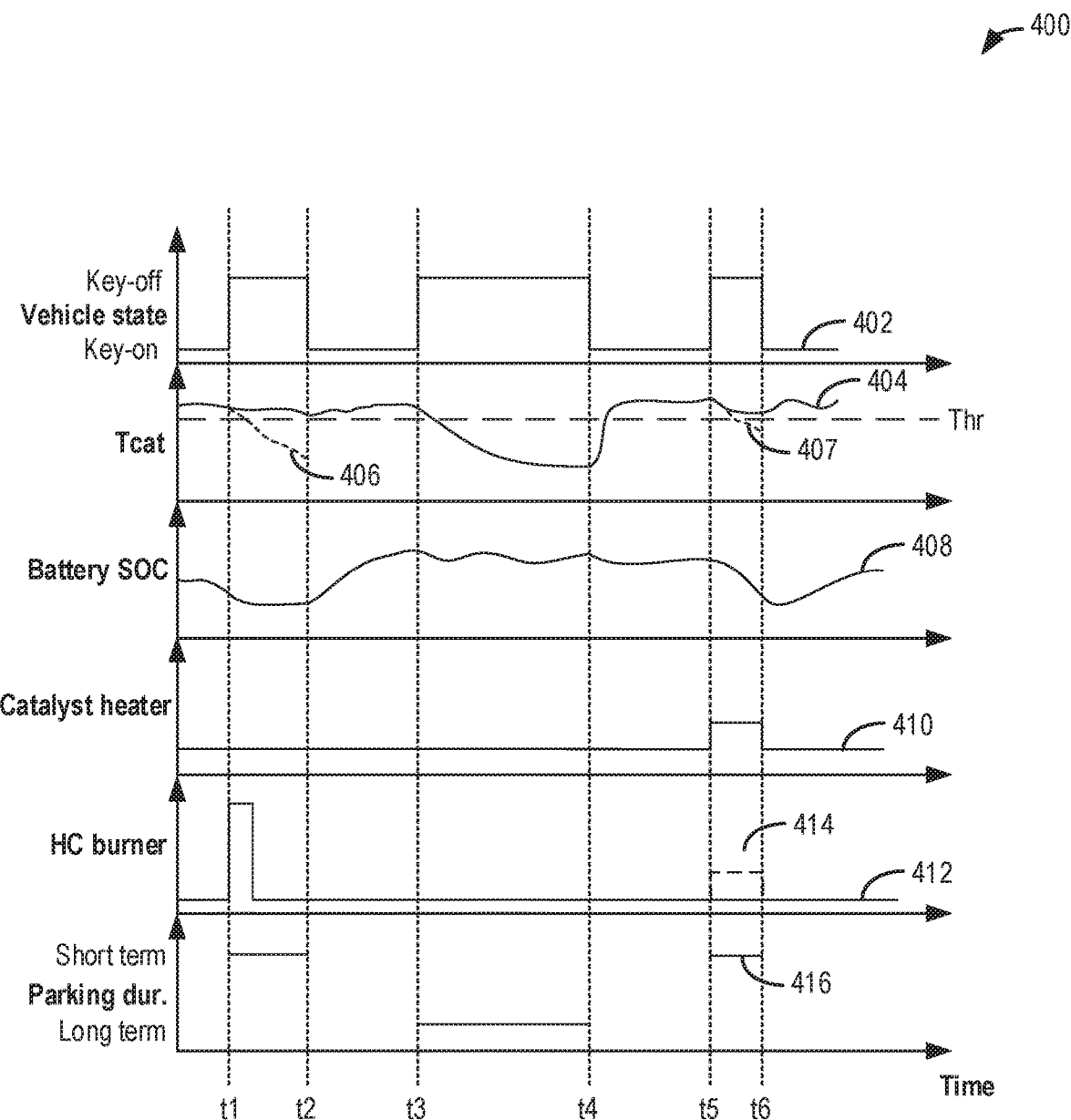
FIG. 4 shows an example engine cold-start operation, according to the present disclosure.

Turning now to FIG. 4, a prophetic example of a cold-start catalyst heating operation is shown at map 400. Map 400 depicts a vehicle state (keyed-on or keyed-off) at plot 402. An exhaust catalyst temperature is depicted at plot 404 relative to a threshold (Thr) which may be a light-off temperature of the catalyst. The state of charge (SOC) of a system battery is shown at plot 406. The battery is used to power an electric motor of the hybrid vehicle. In addition, the battery is used to power one or more catalyst heating devices. Plot 410 depicts the operation of a first catalyst heating device, viz., an electric catalyst heater. Plot 412 depicts the operation of a second catalyst heating device, viz., an electric hydrocarbon burner. An anticipated parking duration of the vehicle predicted by a vehicle controller at the onset of a vehicle key-off event is depicted at plot 416. If the vehicle is predicted to be parked for less than a threshold duration, then short term parking is indicated. If the vehicle is predicted to be parked for more than the threshold duration, then long term parking is indicated.

Prior to t1, the vehicle is keyed-on and the engine is combusting fuel to propel the vehicle. At this time, the catalyst is sufficiently hot and therefore all heating devices are disabled. At t1, the vehicle is keyed-off. Based on the GPS location of the vehicle, as determined from a vehicle navigation system, as well as based on the driver's drive history, a vehicle controller may infer that the vehicle will be parked for a short term. For example, GPS location information may indicate that the vehicle is parked near a coffee shop. Based on drive history, it may be determined that the operator frequently stops near coffee shops for 5-10 minutes. Therefore, while the vehicle is keyed-off and parked, a heating device is operated. Alternatively, catalyst heating may be initiated after the catalyst temperature has dropped to below a threshold temperature, the threshold temperature being at or above the catalyst light-off temperature. Due to the battery SOC being low at this time, the catalyst heater is not operated, since it is more power intense. Instead, the HC burner is operated for a short duration. In this example, the short duration is a fraction of the time the vehicle is parked. In other examples, the HC burner may be operated for the entirety of the short term parking duration. By operating the HC burner, a catalyst temperature drop is averted. If the HC burner were not operated, the catalyst may have dropped below the threshold, as shown at dashed segment 406, causing additional fuel usage during a subsequent restart. At t2, the vehicle is keyed-on. Due to the operation of the HC burner, the catalyst remains above the threshold temperature at the engine restart and a lower fuel penalty may be incurred relative to the fuel penalty for heating a catalyst during a cold catalyst. Also, cold start emissions quality may be improved.

At t3, the vehicle is keyed-off again. Based on the GPS location of the vehicle, as determined from a vehicle navigation system, as well as based on the driver's drive history, the vehicle controller may infer that the vehicle will be parked for a long term. For example, GPS location information may indicate that the vehicle is parked near the operator's place of work. Based on drive history, it may be determined that the operator remains there for at least 8 hours. Therefore, while the vehicle is keyed-off and parked, the heating devices are maintained disabled, and the catalyst is allowed to cool. Herein, the power used to maintain the catalyst temperature over the duration of the long term parking is higher than the fuel penalty incurred in heating the cold catalyst at a subsequent engine restart. At t4, the vehicle is keyed-on. The catalyst temperature is raised above the threshold temperature at the engine restart by operating the engine rich and/or with spark timing retarded from MBT or retarding combustion phasing through retarded main injection and post injection.

At t5, the vehicle is keyed-off again. Based on the GPS location of the vehicle, as determined from a vehicle navigation system, as well as based on the driver's drive history, the vehicle controller may infer that the vehicle will be parked for a short term. For example, GPS location information may indicate that the vehicle is parked near a grocery store. Based on drive history, it may be determined that the operator frequently stops near this particular grocery store for 15-20 minutes. Therefore, while the vehicle is keyed-off and parked, a heating device is operated. Due to the battery SOC being sufficiently high at this time, the catalyst heater is operated at between time t5 and t6. The heater is operated at a lower power in order to maintain the catalyst temperature above the threshold temperature In further examples, optionally, the HC burner may also be operated (as shown at dashed plot 414) to supplement the power delivered by the catalyst heater. Fuel and air supplied to the HC burner is adjusted to maintain the catalyst temperature above the catalyst light-off temperature. By operating the HC heater at a consistent, lower power, the catalyst temperature is maintained above the threshold with lower energy (fuel and/or battery power) consumption.

In this example, the short duration is a fraction of the time the vehicle is parked. In other examples, the heater and/or the HC burner may be operated for the entirety of the short term parking duration. By operating the catalyst heater (and the HC burner), a catalyst temperature drop is averted. If the heating devices were not operated, the catalyst temperature may have dropped below the threshold, as shown at dashed segment 407, causing additional fuel usage during a subsequent restart.

In this way, various attributes of a vehicle operator's driving pattern may be learned statistically or stochastically. By learning attributes such as frequency of trips, key-on and key-off probabilities, road and route based driving profiles, environmental attribute profiles, etc., and combining them with positional information of a vehicle, such as data regarding local businesses, etc., engine-off durations at upcoming key-off events may be predicted more reliably and accurately. This in turn allows the operation of catalyst heating devices to be adjusted so that catalyst function maintenance can be better balanced with fuel economy. In particular, heating devices can be operated only when an engine restart is considered to be imminent, such as when the vehicle is predicted to be parked for a limited amount of time. By further selecting which heating devices to operate, and in which order, during the short term parking, based on vehicle operating conditions such as battery state of charge and fuel tank fill level, vehicle power consumption for catalyst heating operations can be minimized.

An example vehicle comprises: at a vehicle-off event, selectively operating one or more exhaust catalyst heating devices based on a combination including vehicle drive history and vehicle positional information. In any preceding example, additionally or optionally, the selectively operating includes selectively operating based on a predicted duration of vehicle parking, the duration predicted based on the combination of drive history and vehicle positional information. In any or all of the preceding examples, additionally or optionally, the vehicle positional information includes each of a geostationary position of the vehicle at off, and a relative position of landmarks and business establishments within a threshold radius of the position of the vehicle. In any or all of the preceding examples, additionally or optionally, the selectively operating includes operating the one or more exhaust catalyst heating devices when the predicted duration is lower than a threshold duration, and maintaining the one or more exhaust catalyst heating devices disabled when the predicted duration is higher than the threshold duration. In any or all of the preceding examples, additionally or optionally, the selectively operating further includes adjusting an order and period of operating the one or more exhaust catalyst heating devices in a given drive cycle based on the combination of drive history and vehicle positional information, the order and period further adjusted based on vehicle operating conditions including a battery state of charge and a fill level of a fuel tank. In any or all of the preceding examples, additionally or optionally, the one or more exhaust catalyst heating devices include an electrical heater integrated into a brick of an exhaust catalyst, a hydrocarbon burner coupled in an exhaust passage, upstream of the exhaust catalyst, and a phase change material system coupled to a chamber encapsulating the exhaust catalyst, and wherein selectively operating the one or more heating devices is further based on the vehicle positional information relative to a position of a vehicle operator, the vehicle operator position inferred based on signals received from a key fob or communication device held by the operator. In any or all of the preceding examples, additionally or optionally, the further adjusting includes: operating the electrical heater before operating the burner responsive to a higher than threshold battery state of charge or a lower than threshold fuel tank fill level; and operating the burner before the heater responsive to a lower than threshold battery state of charge or a higher than threshold fuel tank fill level. In any or all of the preceding examples, additionally or optionally, the threshold duration is based on each of an exhaust catalyst temperature at the vehicle off event and an ambient temperature, the threshold duration increased as each of the catalyst temperature and the ambient temperature increases. In any or all of the preceding examples, additionally or optionally, the drive history includes a driving pattern of the vehicle operator, the driving pattern including on one or more of frequent trip time and location patterns, habitual probability patterns, route based statistical profiles, and environmental attribute profiles. In any or all of the preceding examples, additionally or optionally, the predicted duration based on the combination of drive history and vehicle positional information includes: responsive to the geostationary position of the vehicle at the off event being within a threshold radius of an establishment of the vehicle during a drive cycle in the drive history, estimating the predicted duration based on an average duration elapsed between a key-off event of the drive cycle and a subsequent key-on event. In any or all of the preceding examples, additionally or optionally, the threshold radius is a function of the geostationary position of the vehicle at the off event.

Another engine example method for a vehicle comprises: predicting a duration of vehicle parking at a vehicle key-off event based on spatial awareness data including a geostationary location of the vehicle at the key-off event and an identity of businesses and landmarks within a threshold radius of the vehicle, and further based on drive history; and operating one or more exhaust catalyst heating devices during the key-off event based on the predicted duration, the one or more exhaust catalyst heating devices selected based on vehicle conditions including battery state of charge and fuel tank fill level. In any or all of the preceding examples, additionally or optionally, the spatial awareness data further includes a geostationary location of a vehicle operator relative to the geostationary location of the vehicle at the key-off event, the geostationary location of the vehicle operator retrieved from a key fob or a spatially aware device retained by the operator, the method further comprising selecting an order and period of operating the one or more exhaust catalyst heating devices based on the spatial awareness data and the vehicle conditions and further based on exhaust catalyst temperature at the key-off event. In any or all of the preceding examples, additionally or optionally, the key-off event is a key-off event of a current drive cycle, and wherein the drive history includes an identity of businesses and landmarks selected by a vehicle operator on a navigation system of the vehicle on a drive cycle prior to the current drive cycle, and an average duration elapsed between a key-off event and a subsequent key-on event of the drive cycle prior to the current drive cycle. In any or all of the preceding examples, additionally or optionally, the predicting includes: responsive to the identity of businesses and landmarks within the threshold radius of the vehicle at the key-off event matching the identity of businesses and landmarks selected by the vehicle operator on the navigation system of the vehicle on the drive cycle prior to the current drive cycle, predicting the duration based on the average duration elapsed between the key-off event and the subsequent key-on event of the drive cycle prior to the current drive cycle. In any or all of the preceding examples, additionally or optionally, the operating includes: operating the one or more exhaust catalyst heating devices during the key-off event if the predicted duration is lower than a threshold duration; and disabling the one or more exhaust catalyst heating devices during the key-off event if the predicted duration is higher than the threshold duration, the threshold duration based on one or more of the exhaust catalyst temperature, an ambient temperature, and a catalyst light-off temperature. In any or all of the preceding examples, additionally or optionally, the one or more exhaust catalyst heating devices include an electrical heater integrated into a brick of an exhaust catalyst or wrapped around the brick, a hydrocarbon burner coupled in an exhaust passage, upstream of the exhaust catalyst, and a phase change material system coupled to a chamber encapsulating the exhaust catalyst, and wherein selecting the order includes operating the electrical heater before operating the burner responsive to the battery state of charge being higher than a threshold charge or the fuel tank fill level being lower than a threshold level; and operating the burner before the heater responsive to the battery state of charge being lower than the threshold charge or the fuel tank fill level being higher than the threshold level.

In yet another example, a vehicle system comprising, an engine with an exhaust passage, the engine fueled via an injector drawing fuel from a fuel tank, an exhaust catalyst coupled in the exhaust passage, a catalyst heater coupled to the exhaust catalyst, a fuel burner coupled upstream of the catalyst in the exhaust passage, a heat exchange system including a pump for circulating a phase change material (PCM) drawn from a reservoir through a cavity surrounding the catalyst, the heat exchange system further including a PCM heater for heating PCM in the reservoir, a battery powering each of the catalyst heater, the fuel burner, and the PCM heater, a navigation system, and a controller with computer readable instructions stored on non-transitory memory which when executed cause the controller to: store, in the memory, position-aware data related to each drive cycle of the vehicle, the data received from the navigation system, the data including an origin point, a destination point, an identity of establishments at one or more interim stops of each drive cycle, and an average duration elapsed between a key-off event and a subsequent key-on event at the one or more interim stops of each drive cycle, and on a key-off event of a current drive cycle, predict an anticipated duration till a subsequent key-on event based on the stored position aware data relative to a current position of the vehicle, and selectively operate one or more of the catalyst heater, the fuel burner, and the heat exchange system to maintain catalyst temperature at the key-off event based on the anticipated duration. In any preceding example, additionally or optionally, the controller further includes instructions to: select an order of operating a plurality of the catalyst heater, the fuel burner, and the heat exchange system based on each of a state of charge of the battery and a fill level of the fill tank. In any or all of the preceding examples, additionally or optionally, predicting the anticipated duration includes: comparing the identity of establishments at one or more interim stops of each drive cycle to an identity of establishments within a threshold radius of the current position of the vehicle, and responsive to a match, predicting the anticipated duration based on the average duration elapsed between a key-off event at a matched establishment and a subsequent key-on event on one or more prior drive cycles.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle method, comprising:
during an engine shut-down condition,
selectively operating one or more exhaust catalyst heating devices based on a combination including a vehicle drive history and vehicle positional information,
wherein the selectively operating includes selectively operating based on a predicted duration of vehicle parking, the duration predicted based on the combination of the vehicle drive history and the vehicle positional information;
wherein the selectively operating further includes operating the one or more exhaust catalyst heating devices when the predicted duration of vehicle parking is lower than a threshold duration, and maintaining the one or more exhaust catalyst heating devices disabled when the predicted duration of vehicle parking is higher than the threshold duration.

2. The method of claim 1, wherein the vehicle positional information includes each of a geostationary position of the vehicle at off and a relative position of landmarks and business establishments within a threshold radius of the geostationary position of the vehicle.

3. The method of claim 2, wherein the vehicle drive history includes a driving pattern of a vehicle operator, the driving pattern including one or more of frequent trip time and location patterns, habitual probability patterns, route based statistical profiles, and environmental attribute profiles.

4. The method of claim 3, wherein the predicted duration based on the combination of the vehicle drive history and the vehicle positional information includes:
responsive to the geostationary position of the vehicle during the engine shut-down condition being within a threshold radius of an establishment of the vehicle during a drive cycle in the vehicle drive history, estimating the predicted duration based on an average duration elapsed between a key-off event of the drive cycle and a subsequent key-on event.

5. The method of claim 4, wherein the threshold radius is a function of the geostationary position of the vehicle during the engine shut-down condition.

6. The method of claim 1, wherein the selectively operating further includes adjusting an order and period of operating the one or more exhaust catalyst heating devices in a given drive cycle based on the combination of the vehicle drive history and the vehicle positional information, the order and period further adjusted based on vehicle operating conditions including a battery state of charge and a fill level of a fuel tank.

7. The method of claim 6, wherein the one or more exhaust catalyst heating devices include an electrical heater integrated into a brick of an exhaust catalyst, a hydrocarbon burner coupled in an exhaust passage, upstream of the exhaust catalyst, and a phase change material system coupled to a chamber encapsulating the exhaust catalyst, and wherein selectively operating the one or more exhaust heating devices is further based on the vehicle positional information relative to a position of a vehicle operator, the vehicle operator position inferred based on signals received from a key fob or a communication device held by the operator.

8. The method of claim 7, wherein the further adjusting includes:
  operating the electrical heater before operating the hydrocarbon burner responsive to a higher than threshold battery state of charge or a lower than threshold fuel tank fill level; and
  operating the hydrocarbon burner before the electrical heater responsive to a lower than threshold battery state of charge or a higher than threshold fuel tank fill level.

9. The method of claim 1, wherein the threshold duration is based on each of an exhaust catalyst temperature during the engine shut-down condition and an ambient temperature, the threshold duration increased as each of the exhaust catalyst temperature and the ambient temperature increases.

10. A method for a vehicle, comprising:
  predicting a duration of vehicle parking at a vehicle key-off event based on spatial awareness data including a geostationary location of the vehicle at the key-off event and an identity of businesses and landmarks within a threshold radius of the vehicle, and further based on a drive history of a vehicle operator; and
  operating one or more exhaust catalyst heating devices during the key-off event based on the predicted duration, the one or more exhaust catalyst heating devices selected based on vehicle conditions including a battery state of charge and a fuel tank fill level.

11. The method of claim 10, wherein the spatial awareness data further includes a geostationary location of a vehicle operator relative to the geostationary location of the vehicle at the key-off event, the geostationary location of the vehicle operator retrieved from a key fob or a spatially aware device retained by the operator, the method further comprising selecting an order and period of operating the one or more exhaust catalyst heating devices based on the spatial awareness data and the vehicle conditions and further based on an exhaust catalyst temperature at the key-off event.

12. The method of claim 11, wherein the one or more exhaust catalyst heating devices include an electrical heater integrated into a brick of an exhaust catalyst or wrapped around the brick, a hydrocarbon burner coupled in an exhaust passage, upstream of the exhaust catalyst, and a phase change material system coupled to a chamber encapsulating the exhaust catalyst, and wherein selecting the order includes operating the electrical heater before operating the hydrocarbon burner responsive to the battery state of charge being higher than a threshold charge or the fuel tank fill level being lower than a threshold level, and operating the hydrocarbon burner before the electrical heater responsive to the battery state of charge being lower than the threshold charge or the fuel tank fill level being higher than the threshold level.

13. The method of claim 10, wherein the key-off event is a key-off event of a current drive cycle, and wherein the drive history includes an identity of businesses and landmarks selected by the vehicle operator on a navigation system of the vehicle on a drive cycle prior to the current drive cycle, and an average duration elapsed between a key-off event and a subsequent key-on event of the drive cycle prior to the current drive cycle.

14. The method of claim 13, wherein the predicting the duration of vehicle parking includes:
  responsive to the identity of businesses and landmarks within the threshold radius of the vehicle at the key-off event matching the identity of businesses and landmarks selected by the vehicle operator on the navigation system of the vehicle on the drive cycle prior to the current drive cycle, predicting the duration of vehicle parking based on the average duration elapsed between the key-off event and the subsequent key-on event of the drive cycle prior to the current drive cycle.

15. The method of claim 10, wherein the operating includes:
  operating the one or more exhaust catalyst heating devices during the key-off event if the predicted duration of vehicle parking is lower than a threshold duration; and
  disabling the one or more exhaust catalyst heating devices during the key-off event if the predicted duration of vehicle parking is higher than the threshold duration, the threshold duration based on one or more of the exhaust catalyst temperature, an ambient temperature, and a catalyst light-off temperature.

* * * * *